United States Patent [19]

Giannini

[11] Patent Number: 4,690,495

[45] Date of Patent: Sep. 1, 1987

[54] OPTICAL FIBER MAGNETIC CONNECTOR

[76] Inventor: Gabriel M. Giannini, 51555 Madison St., Indio, Calif. 92120

[21] Appl. No.: 671,325

[22] Filed: Nov. 14, 1984

[51] Int. Cl.$^4$ .............................................. G02B 6/38
[52] U.S. Cl. ............................... 350/96.21; 350/96.20; 350/96.18; 439/40
[58] Field of Search ............... 350/96.10, 96.15, 96.20, 350/96.21, 96.22, 96.18; 339/12 R

[56] References Cited

U.S. PATENT DOCUMENTS

| | | | |
|---|---|---|---|
| 2,953,970 | 9/1960 | Maynard | 339/12 R |
| 3,521,216 | 7/1970 | Tolegian | 339/12 R |
| 3,786,391 | 1/1974 | Mathauser | 339/12 R |
| 3,803,409 | 4/1974 | Prochazka | 350/96.21 X |
| 3,810,258 | 5/1974 | Mathauser | 339/12 R |
| 4,025,964 | 5/1977 | Owens | 339/12 R |
| 4,641,915 | 2/1987 | Asakawa et al. | 350/96.18 |

FOREIGN PATENT DOCUMENTS

| | | | |
|---|---|---|---|
| 2646010 | 4/1978 | Fed. Rep. of Germany | 339/12 R |
| 2916763 | 10/1979 | Fed. Rep. of Germany | 350/96.21 |

Primary Examiner—William L. Sikes
Assistant Examiner—Brian M. Healy
Attorney, Agent, or Firm—Charmasson & Holz

[57] ABSTRACT

An optical fiber connector for underwater or other difficult applications includes a female member having a length of optical fiber centrally disposed therein and coupled to a lens at the bottom of a recess containing a generally circular arrangement comprised of a first pair of permanent magnet poles of opposite polarity. The female member has an opposite pair of outer ramp surfaces which terminate in an opposite pair of pin receiving slots. An opposite male member which is relatively easily coupled to and uncoupled from the female member has a length of optical fiber centrally disposed therein and terminating in a lens at an end of the male member within a generally circular arrangement comprised of a second pair of permanent magnet poles of opposite polarity. Insertion of the end of the male member into the recess within the female member places an opposite pair of pins mounted on the end of the male member on the ramp surfaces and disposes each of the first pair of permanent magnet poles of the male member offset from one of the second pair of permanent magnet poles of opposite polarity within the female member. Rotation of the male member advances the opposite pins along the ramp surfaces of the female member and into the slots to hold the male member in a coupled position within the female member. Rotation of the male member into the coupled position is encouraged by the opposing permanent magnet poles which move into alignment with poles of opposite polarity as the male member rotates into the coupled position.

4 Claims, 6 Drawing Figures

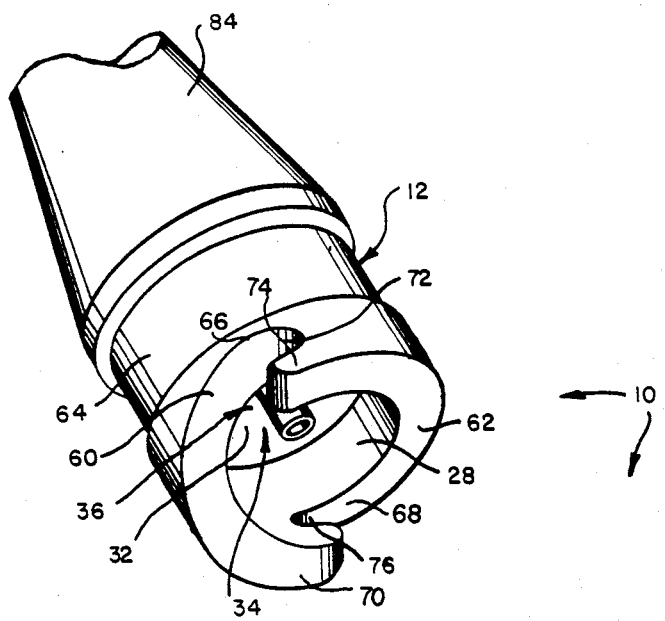
FIG.1
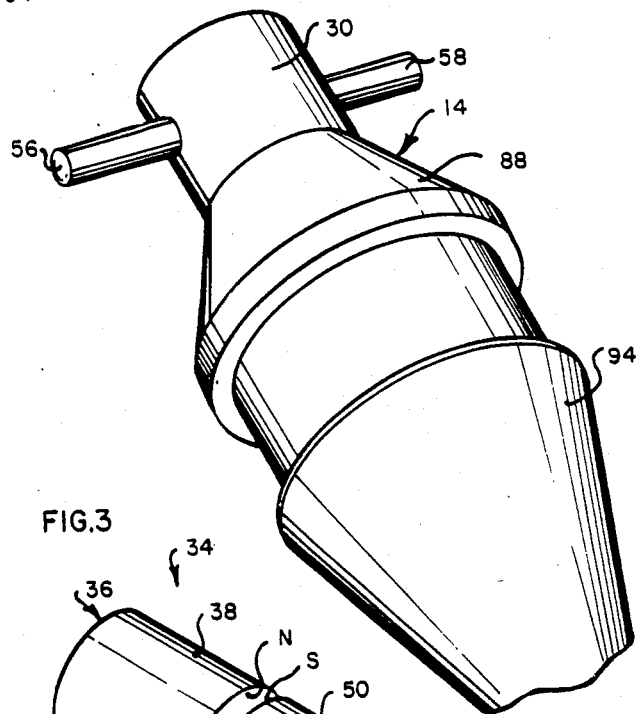
FIG.2 FIG.3
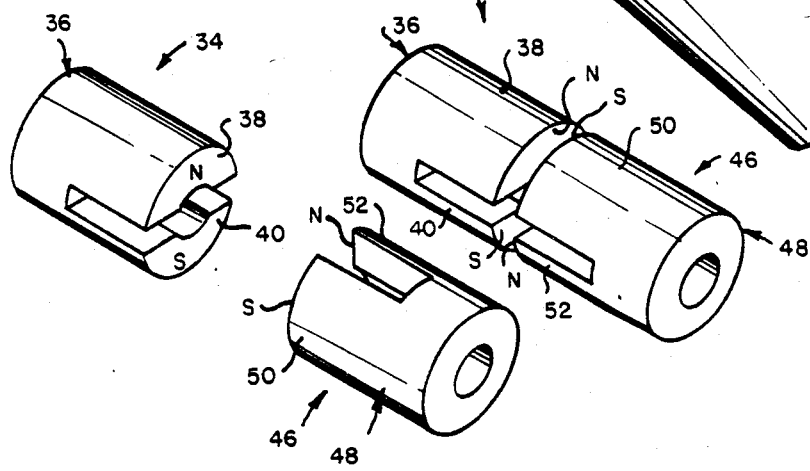

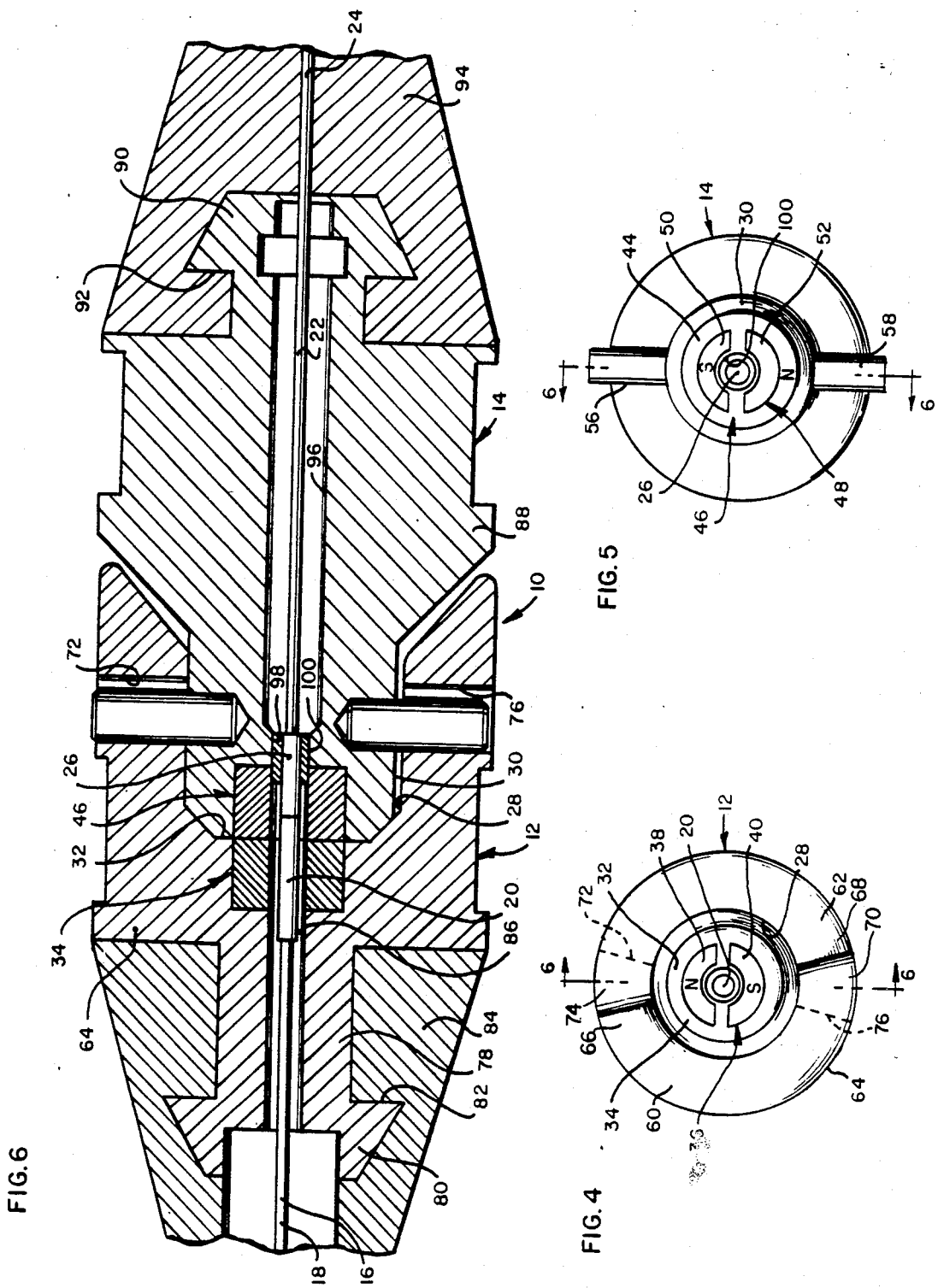

OPTICAL FIBER MAGNETIC CONNECTOR

BACKGROUND OF THE INVENTION

1. Field of the Invention

The present invention relates to connectors for releasably joining optical fibers, electrical conductors or other conducting elements, and more particularly to connectors designed for underwater and other difficult applications in which a male member is coupled to an opposing female member to provide coupling of one or more optical fibers, electrical conductors or other conducting elements with relatively close precision.

2. History of the Prior Art

Various connectors are known in which one or more conductors within a first member are coupled to one or more corresponding conductors within a mating second member in releasable fashion. The conductors may be of the optical fiber type in which it is desired to couple opposite lengths of optical fiber. The conductors may also be of the electrical type in which opposite wires are to be coupled together. In still other instances the conductors may comprise fluid conduits which are to be joined together such as in a hydraulic or pneumatic system.

Connectors of such varying types typically involve certain common goals including in particular the ability to couple and uncouple the opposite mating members of the connector with relative ease and in a fashion providing for relatively precise fit and alignment. In particular, it is often desirable to make the opposing members of the connector self-mating in the sense that the members are easily aligned to achieve the coupling, are generally symmetrical at various different relative angles and effect interconnection therebetween in a manner which is assisted by mechanical, magnetic or other devices to facilitate ease of connection. Such features are of particular importance in difficult environments such as underwater applications where ease of connection becomes of paramount importance. A diver wearing heavy gloves or a pressure suit, for example, will frequently have a difficult time effecting coupling of the mating members of a connector which is otherwise relatively simple and easy to operate in air or in other less challenging environments. Similar considerations apply where a robot is employed to operate such connectors in underwater or other difficult environments.

The problems of providing an easily operated connector for underwater or other difficult applications are particularly acute in the case of optical fiber connectors where the conductors to be joined comprise opposite lengths of optical fiber positioned centrally within the opposing members of the connector. Optical fiber connectors may be of the fiber-to-fiber type in which opposite lengths of optical fiber are disposed adjacent and in alignment with one another upon making of the connection. Connectors of this type require extreme accuracy which is difficult to achieve when single fibers are being connected and is even more difficult to achieve when multiple fibers are involved. In a second approach the opposite mating members are provided with quarter pitch self-focusing lenses which provide an expanded beam in the form of a collimator. Such an arrangement is far more tolerant of variations in the distance between the lenses. In a still further approach a half pitch lens is used. Such approach requires rather precise positioning of the lens face relative to adjacent fibers, making this approach impractical for all but a few connector applications. Further problems are created because of such things as different water refraction between the fiber optical fibers and the lenses, impairment of lens surfaces by sea water and insertion loss variations. Oils and jellies have been used to provide index matching between fibers and lenses, with limited success.

Examples of optical fiber connectors using lenses at the interface between opposite mating members are provided by a paper by Dennis M. Knecht and W. John Carlsen entitled "Expanded Beam Fiber Optic Connectors" and by various brochures of Nippon Sheet Glass Company, Ltd. The article by Knecht and Carlsen describes an optical fiber connector in which alignment and certain other tolerances are relaxed through use of a molded lens insert and the elastomeric fiber guides. The brochures of Nippon Sheet Glass Company, Ltd. describe connectors using quarter pitch self-focusing lenses which form an expanded beam or collimator.

Various arrangements of connectors have been provided in an attempt to improve the characteristics of connectors of the optical fiber, electrical or similar type. One example is provided by U.S. Pat. No. 3,786,391 of Mathauser which shows an electrical connector utilizing permanent magnets in opposing male and female connector halves. While the Mathauser patent suggests the concept of utilizing magnetic pole alignment to aid in aligning the electrical contacts, the patent does not relate to or contemplate the type of connector configuration required for underwater or other difficult environments and in particular a connector of that type that would be self-mating. Still further examples of connectors using magnetic or other devices to facilitate connection are provided by U.S. Pat. Nos. 4,112,941 of Larimore, 4,025,964 of Owens, 3,810,258 of Mathauser, 2,170,287 of Kinnebrew, 2,226,287 of Miller and 2,347,023 of Beechlyn.

Still further examples of connectors are provided by a brochure of Crawford Fitting Company describing "Swagelok QUICK-CONNECTS". The connectors described therein which are of the type used to couple together fluid conduits employ arrangements in conjunction with a spring-loaded sleeve to provide for relatively quick and easy connection and disconnection.

The various connectors of the prior art which have been described provide features and advantages in an effort to realize connectors which are relatively easy and simple to use and which at the same time provide in many instances a relatively positive and precise fit or interconnection between the opposing mating members. However such connectors do not provide and do not suggest how to provide certain desired features in connectors designed for use in underwater and certain other difficult applications. In particular, it would be desirable to provide a connector designed for use in underwater or other difficult applications in which the connector is essentially self-mating so as to effect the intercoupling therebetween in a manner assisted by magnetic or other devices so as to greatly simplify the manual operation thereof. It would furthermore be desirable that such connector facilitate easy insertion of the male member into an opposing mating female member in a fashion which makes the connector self-aligning in nature and which makes the connector essentially symmetrical through various different ranges of relative angular position. Of particular advantage would be the provision of a mechanical latching arrangement functioning in conjunction with a magnetic or other arrangement for facilitating movement of the opposing members of the connector into the coupled position so as to tend to hold the members in such position in a manner which resists inadvertent or unwanted uncoupling thereof.

BRIEF DESCRIPTION OF THE INVENTION

The present invention provides a self-mating connector in which opposite, mating male and female members carrying conductors of the optical fiber, electrical or other type to be connected are readily aligned and then rotatably driven relative to one another into a coupled relationship, assisted by magnetic attraction. A mechanical latching arrangement is employed in conjunction with the magnetic attraction to facilitate easy and substantially automatic movement of the opposing members into the coupled position and so as to thereafter retain the connector in such coupled position with sufficient force and security so as to resist the inadvertent or unwanted uncoupling thereof.

In a preferred arrangement of a connector in accordance with the invention the opposite, mating members comprise male and female members, each of which is provided with a permanent magnet. The permanent magnet on an outer end of the male member interacts with the permanent magnet within a recess in the female member to assist in rotating the male member into a coupled position within the female member. The male member is provided with opposite pins thereon which engage opposite ramp surfaces on the female member. The ramp surfaces on the female member are sloped in a direction to provide axial advancement of the male member into the recess within the female member as the male member rotates relative to the female member to advance the pins along the respective ramp surfaces. Each ramp surface terminates in a slot for receiving and holding the associated pin therein so as to lock the connector in the coupled position against inadvertent or unwanted uncoupling.

The permanent magnets within the male and female members each comprise a generally U-shaped element having a pair of poles of opposite polarity. The permanent magnets are oriented relative to the pins on the male member and the ramp surfaces on the female member so as to position the poles within the adjacent magnets to be offset by up to 180° from poles of opposite polarity when the pins are first positioned on the ramp surfaces to begin coupling of the male and female members together. As rotation of the male member relative to the female member is commenced so as to advance the pins of the male member along the ramp surfaces, the magnetic attraction between the somewhat offset poles of opposite polarity aids such rotation until the pins become seated within the slots at the end of the ramp surfaces to complete the coupling of the male and female members together. When in such coupled position, the poles of opposite polarity are disposed adjacent each other.

Uncoupling of the connector is easily accomplished by rotating the male member relative to the female member in an opposite direction so as to unseat the pins from the slots at the ends of the ramp surfaces. Thereafter the pins ride up along the ramp surfaces so as to effect uncoupling as rotation of the male member relative to the female member is continued. When the pins in the male member ride up to the starting edges of the associated ramp surfaces, the various poles of opposite polarity are once again offset from each other by approximately 180° or a little less which facilitates separation of the male member from the female member.

Each of the male and female members is provided with a centrally disposed conductor. In the present example the connector is of the optical fiber type such that each conductor comprises a length of optical fiber coupled to a lens disposed adjacent the interface between the male and female members.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 1 is a perspective view of the opposite, mating male and female members of a self-mating optical fiber connector in accordance with the invention;

FIG. 2 is a perspective view of two different magnet arrangements in the connector of FIG. 1 illustrating the manner in which the magnet arrangements interact to provide self-mating of the connector of FIG. 1;

FIG. 3 is a perspective view of the two different magnet arrangements similar to the view of FIG. 2 but with the magnet arrangements rotated into the relative position that they assume when the connector of FIG. 1 is in a coupled position;

FIG. 4 is an end view of the female member of the connector of FIG. 1;

FIG. 5 is an end view of the male member of the connector of FIG. 1; and

FIG. 6 is a sectional view of the connector of FIG. 1 taken along the lines 6—6 of FIGS. 4 and 5, with the connector in a coupled position.

DETAILED DESCRIPTION

FIG. 1 depicts a self-mating connector 10 in accordance with the invention. The connector 10 is comprised of a female member 12 and an opposite, mating male member 14. Each of the female and male members 12 and 14 is provided with a centrally disposed conductor such that coupling of the members 12 and 14 together effects the desired coupling of such connectors. In the present example the connector 10 is of the optical fiber type so that the conductors are comprised of opposite lengths of optical fiber. Thus, as shown in FIG. 6 the female member 12 is provided with a length of fiber 16 which is centrally disposed within the female member 12 along an axis of elongation 18 thereof and which terminates in a lens 20. In similar fashion the male member 14 is provided with a length of fiber 22 extending along an axis of elongation 24 of the male member 14 and having an end terminating at a lens 26.

While the connector 10 in accordance with the invention is shown and described herein as an optical fiber connector, it should be understood by those skilled in the art that connectors according to the invention may also be used with other types of conductive elements such as electrical wires which are to be selectively coupled together.

The female member 12 has a generally cylindrical recess 28 therein for receiving a generally cylindrical end 30 of the male member 14. The recess 28 has a bottom surface 32 thereof which is shown in FIG. 4. Recessed within the bottom surface 32 is a magnet arrangement 34 which in the present example comprises a generally U-shaped permanent magnet 36 having opposite poles 38 and 40 of North (N) and South (S) polarity respectively. The poles 38 and 40 are disposed within the bottom surface 32 of the recess 28 within the female member 12 so as to be generally flush with the bottom surface 32 and to assume a generally circular array concentric with the axis of elongation 18.

The end 30 of the male member 14 has an end surface 44 which is disposed adjacent the bottom surface 32 of the recess 28 within the female member 12 when the members 12 and 14 are in a coupled position. The end 30 is provided with a magnet arrangement 46 which in the present example comprises a generally U-shaped permanent magnet 48 having opposite poles 50 and 52 of South (S) and North (N) polarity respectively. As in the case of the magnet arrangement 34 within the female member 12, the poles 50 and 52 are disposed within the end surface 44 in a generally circular array which is concentric with the axis of elongation 24 of the male member 14 and with the poles 50 and 52 being generally flush with the end surface 44.

The male member 14 has an opposite pair of pins 56 and 58 mounted thereon. The pins 56 and 58 extend outwardly from the end 30 of the male member 14 in opposite directions along an axis which intersects and is generally perpendicular to the axis of elongation 24 of the male member 14. The pins 56 and 58 are adapted for engagement with a pair of opposite ramp surfaces 60 and 62 in the female member 12. The ramp surfaces 60 and 62 which are formed at the end of a generally cylindrical housing 64 forming a part of the female member 12 are disposed on opposite sides of the recess 28 and are of partially curved configuration in that they extend around the cylindrical housing 64. Each of the ramp surfaces 60 and 62 extends around one-half the circumference of the housing 64 in the present example, although other configurations such as one-fourth the circumference are possible. The ramp surface 60 which also extends around one-half the circumference of the cylindrical housing 64 in the present example advances helicoidally and axially along the length of the female member 12 as it extends from the edge 70 to the opposite end 66 thereof where a slot 72 is formed. The ramp surface 62 begins at the edge 74 and advances helicoidally and axially along the female member 12 in the same manner as the ramp surface 60 as it extends to a slot 76 at the opposite end 68 thereof. The slot 76 is disposed adjacent an end of the ramp 62.

The ramp surfaces 60 and 62 having the slots 72 and 76 at the ends thereof combine with the pins 56 and 58 in the male member 14 to provide an arrangement for guiding the male member 14 into the recess 28 in the female member 12 so as to eventually assume a coupled position, while at the same time providing alignment of the female and male members 12 and 14. The pins 56 and 58 slide along the ramp surfaces 60 and 62 to provide for advancement of the male member 14 into the recess 28 of the female member 12. The end 30 of the male member 12 has a diameter slightly smaller than the diameter of the recess 28 in the female member 12. This provides for proper alignment of the male member 14 within the female member 12 so that the lenses 20 and 26 are relatively precisely aligned when the coupled position is reached. The male and female members 14 and 12 reach the coupled position when the pins 56 and 58 seat within the slots 72 and 76. Disposition of the pins 56 and 58 within the slots 72 and 76 serves to hold the male member 14 in the coupled position within the female member 12 and to resist inadvertent or unwanted release. However, release is simply accomplished by rotating the male member 14 relative to the female member 12 in an opposite direction so as to unseat the pins 56 and 58 from the slots 72 and 76 and thereafter cause the pins 56 and 58 to ride up on the ramp surfaces 60 and 62 until they at least clear the slots 72 and 76.

In accordance with the invention the magnet arrangements 34 and 46 combine with the action of the pins 56 and 58, the ramp surfaces 60 and 62 and the slots 76 and 72 to facilitate coupling of the male and female members 14 and 12 in a manner which makes the connector 10 virtually selfmating. As seen in FIG. 2 the opposite poles 38 and 40 of the magnet 36 at the bottom surface 32 of the female member 12 are spaced apart from and rotated approximately 180° from the poles 50 and 52 of opposite polarity of the magnet 48 at the end 30 of the male member 14 when the pins 56 and 58 of the male member 14 are positioned at or adjacent the edges 70 and 74 in the cylindrical housing 64 of the female member 12 to commence a coupling operation. Accordingly, there is virtually no attraction between the poles of the two different arrangements 34 and 46. If rotation of the male member 14 relative to the female member 12 is now begun, the pins 56 and 58 slide along the opposite ramp surfaces 60 and 62 to begin advancing the end 30 of the male member 14 into the recess 28 of the female member 12. At the same time the permanent magnet 48 comprising the magnet arrangement 46 is rotated relative to the permanent magnet 36 comprising the arrangement 34 and at the same time the magnets 36 and 48 are brought somewhat closer together. This causes an attractive force between the poles of opposite polarity of the magnets 36 and 48. Accordingly, there is attraction between the poles 38 and 50 and between the poles 40 and 52. The resulting force helps to rotate the male member 14 relative to and thereby draw it closer to the female member 12 until the pins 56 and 58 are engaged within the slots 72 and 76 and the male and female members 14 and 12 are in the coupled position.

FIG. 3 depicts the permanent magnets 36 and 48 when the male and female members 14 and 12 are in the coupled position. It will be seen that each of the poles of the permanent magnet 36 is disposed very close to if not contacting a pole of opposite polarity of the permanent magnet 48.

It will therefore be seen that the magnet arrangements 34 and 46 interact in such a way as to exert forces on each other which tend to rotate the male member 14 into the coupled position within the female member 12 and to thereafter hold the male and female members 14 and 12 in such position. In the present example in which each of the magnets 36 and 48 has a pair of poles approximately 180° removed from each other relative to the central axes of the female and male members 12 and 14, the magnets 36 and 48 can be rotatably offset up to 180° from each other and still be mutually magnetically attracted so as to rotate toward the coupled position shown in FIG. 3. In actual practice the attractive force between the magnet arrangements 34 and 46 is strong enough in some instances to rotate the male member 14 into the coupled position within the female member 12 virtually without any additional force having to be exerted on the male and female members 14 and 12. This makes the connector 10 relatively easy to use, particularly in difficult environments such as for underwater applications. In underwater applications coupling of the connector 10 must typically be made using either a diver or a robot. A diver typically wears a pressure suit or generally wears gloves which makes handling of the male and female members 14 and 12 difficult. In the case of the connector 10 according to the invention, however, it is only necessary that the diver make the initial insertion of the end 30 of the male member 14 into the recess 28 within the female member 12 so that the pins 56 and 58 are seated on the ramp surfaces 60 and 62. This coupled with some rotation of the male member 14 relative to the female member 12 results in the magnet arrangements 34 and 46 rotating the male member 14 into the coupled position in which the pins 56 and 58 reside within the slots 72 and 76. The coupling operation is similar in the case of a robot where again the ability to handle and manipulate the male and female members 14 and 12 relative to each other is rather limited.

It should be understood that the permanent magnets 36 and 48 comprise but one example of the magnet arrangements 34 and 46. Other arrangements are possible including one in which each of the magnet arrangements 34 and 46 comprises a plurality of different permanent magnets with each such magnet providing a different one of a plurality of different poles.

Uncoupling of the male member 14 from the female member 12 is easily accomplished by rotating the male member 14 relative to the female member 12 so that the pins 56 and 58 unseat from the slots 72 and 76 and begin rotating along the ramp surfaces 60 and 62. Despite the attractive forces between the magnet arrangements 34 and 46 which resist such movement, such movement is made relatively easy because of the camming action provided by the sliding of the pins 56 and 58 along the ramp surfaces 60 and 62. As soon as the pins 56 and 58 are free of the slots 72 and 76, the male and female members 14 and 12 may be separated simply by exerting enough force on them to overcome any magnetic attraction which still remains. Alternatively, sliding movement of the pins 56 and 58 along the ramp surfaces 60 and 62 by rotating the male member 14 relative to the female member 12 can simply be continued until the pins 56 and 58 reach the edges 70 and 74 at the ends of the ramp surfaces 60 and 62. At that point the magnetic attraction is negligible, and the male member 14 may simply be pulled away from the female member 12 to completely remove the end 30 of the male member 14 from the recess 28 of the female member 12.

As seen in FIG. 6 the generally cylindrical housing 64 of the female member 12 not only provides the ramp surfaces 60 and 62 but also defines the recess 28 with its bottom surface 32 and mounts the magnet arrangement 34 within the bottom surface 32. The cylindrical housing 64 has a rear portion 78 thereof which extends outwardly from the housing 64 opposite the recess 28 and terminates in a portion 80 having an annular lip 82. The rear portion 78 of the cylindrical housing 64 is received within a jacket 84 of partially conical configuration. The portion 80 of the rear portion 78 having the annular lip 82 helps to secure the generally cylindrical housing 64 to the jacket 84. The cylindrical housing 64, the rear portion 78 thereof and the jacket 84 all have central apertures therein for receiving the length of fiber 16. The lens 20 and a portion of the length of fiber 16 adjacent thereto are surrounded by a hollow, generally cylindrical alignment sleeve 86. The alignment sleeve 86 extends outwardly from the bottom surface 32 of the recess 28 within the female member 12.

The male member 14 is comprised of a housing 88 of generally circular configuration having the end 30 at one end thereof and a portion 90 having an annular lip 92 at the opposite end thereof. The portion 90 with the annular lip 92 resides within a jacket 94 of partially conical configuration so as to secure the housing 88 to the jacket 94. The jacket 94 has a central aperture therein for receiving the length of fiber 22. The length of fiber 22 also extends through an aperture 96 extending through the portion 90 and a major portion of the housing 88. The length of fiber 22 terminates at the end of the aperture 96 where it interfaces with the lens 26. The lens 26 together with an alignment sleeve 98 are disposed within an aperture 100 within the portion of the housing 88 forming the end 30 of the male member 14. The lens 26 is disposed and the aperture 100 is configured so as to receive therein the portion of the alignment sleeve 86 of the female member 12 extending outwardly from the bottom surface 32 of the recess 28. This enables the outer end of the alignment sleeve 86 of the female member 12 to enter the aperture 100 and surround a portion of the lens 26. This disposes the lenses 20 and 26 adjacent one another and in relatively precise alignment when the male member 14 assumes the coupled position within the female member 12.

While the invention has been particularly shown and described with reference to a preferred embodiment thereof, it will be understood by those skilled in the art that various changes in form and details may be made therein without departing from the spirit and scope of the invention.

What is claimed is:

1. A connector for optically coupling one end of a first fiber optic light guide to one end of a second fiber optic light guide which comprises:
   a first generally tubular member having a first end opening shaped and dimensioned to engage the end of said first fiber optic light guide about a first axis common to said first tubular member and said first fiber optic light guide;
   a first generally U-shaped magnet inserted into said first opening of said first tubular member and defining at least two magnetic poles of opposite polarities symmetrically disposed about a first plane containing said first axis;
   a first cylindrical lens coaxially mounted into said first tubular member, said lens having an inner face in contact with the end of said first fiber optic light guide and an exposed outer face near an opposite second end opening of said first tubular member;
   a second generally tubular member having a first end opening shaped and dimensioned to engage the end of said second fiber optic light guide about a second axis common to said second tubular member and said second fiber optic light guide;
   a second generally U-shaped magnet inserted into said first opening of said second tubular member and defining at least two magnetic poles of opposite polarities symmetrically disposed about a second plane containing said second axis;
   a second cylindrical lens coaxially mounted into said second tubular member, said lens having an inner face in contact with the end of said second fiber optic light guide and an exposed outer face near an opposite second end opening of said second tubular member;
   the edge of the second end opening of said first tubular member defining at least one pair of helicoidal ramps, the ramps in said pair being symmetrically and diametrically opposite in relation to said first axis, said ramps together extending over the entire periphery of said second end opening of said first tubular member and the ends of said pair of ramps which are closest to the end of said first fiber optic generally falling on a first line orthogonal to said first axis;

the second end opening of said second tubular member being shaped and dimensioned to define at least one pair of contact points symmetrically and diametrically positioned in relation to said second axis, said contact points being commensurately positioned to ride on said ramps when the second end openings of said tubular members are brought together until said contact points reach the ends of said ramps, said points being on a second line oriented so that the angle defined by the first line and said first plane is equal to the angle defined by said second line and said second plane. and the poles of the first magnet are lined with the opposite poles of the second magnet when said contact points reach said ends; and said second tubular lens is coaxially positioned within said second tubular member so that its outer face contacts the outer face of the first tubular lens when said points reach the ends of said ramps.

2. The connector claimed in claim 1, wherein said pair of ramps comprise:

two semi-circular ramps;

said first and second magnets each comprise a toroidal base coaxial with its corresponding tubular member, and two opposite poles projections extending toward the second end opening of said tubular member; and each one of said cylindrical lens is coaxially mounted within one of said magnets.

3. The connector claimed in claim 2, wherein said second tubular member comprises two radial and diametrically opposite pins extending from the the edge of the second opening of said second tubular member and defining said contact points.

4. The connector claimed in claim 3, wherein the end of each of said ramps which is closest to the end of said first fiber optic light guide extends beyond said first line and behind a portion of the opposite ramp to define a pair of recesses commensurate with said pins.

* * * * *